US007730128B2

(12) United States Patent
Creamer et al.

(10) Patent No.: US 7,730,128 B2
(45) Date of Patent: *Jun. 1, 2010

(54) EFFORTLESS REGISTRATION WITH CONTENT PROVIDERS AND METHODS THEREOF

(75) Inventors: Thomas E. Creamer, Boca Raton, FL (US); Reza Ghasemi, Pompano Beach, FL (US); Walter Haenel, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/200,093

(22) Filed: Aug. 28, 2008

(65) Prior Publication Data

US 2008/0320562 A1 Dec. 25, 2008

Related U.S. Application Data

(63) Continuation of application No. 11/025,737, filed on Dec. 29, 2004, now Pat. No. 7,478,123.

(51) Int. Cl.
*G06F 15/16* (2006.01)
*G06F 15/173* (2006.01)

(52) U.S. Cl. .................. 709/203; 709/218; 709/219; 709/224; 709/226

(58) Field of Classification Search ............... 709/217, 709/218, 219, 221, 224, 225, 226, 227, 228, 709/245, 246, 203; 707/1; 713/193
See application file for complete search history.

(56) References Cited

U.S. PATENT DOCUMENTS

| 6,094,721 | A | 7/2000 | Eldridge et al. | |
|---|---|---|---|---|
| 6,182,229 | B1 | 1/2001 | Nielsen | |
| 6,484,263 | B1 | 11/2002 | Liu | |
| 6,594,766 | B2 | 7/2003 | Rangan et al. | |
| 6,629,246 | B1 | 9/2003 | Gadi | |
| 7,007,080 | B2 * | 2/2006 | Wilson | 709/221 |
| 7,043,527 | B2 * | 5/2006 | Shiimori et al. | 709/203 |
| 7,191,210 | B2 * | 3/2007 | Grossman | 709/203 |
| 7,269,664 | B2 * | 9/2007 | Hutsch et al. | 709/246 |
| 7,275,089 | B1 * | 9/2007 | Marshall et al. | 709/219 |
| 7,356,841 | B2 * | 4/2008 | Wilson et al. | 709/227 |
| 2001/0034771 | A1 * | 10/2001 | Hutsch et al. | 709/217 |
| 2001/0054155 | A1 * | 12/2001 | Hagan et al. | 713/193 |
| 2002/0067370 | A1 * | 6/2002 | Forney et al. | 709/203 |
| 2002/0091766 | A1 * | 7/2002 | Shiimori et al. | 709/203 |
| 2003/0208624 | A1 * | 11/2003 | Grossman | 709/245 |
| 2004/0025026 | A1 | 2/2004 | Karp et al. | |
| 2004/0143667 | A1 * | 7/2004 | Jerome | 709/228 |
| 2005/0187895 | A1 * | 8/2005 | Paya et al. | 707/1 |

FOREIGN PATENT DOCUMENTS

CN 1353838 A 6/2002

\* cited by examiner

*Primary Examiner*—Quang N. Nguyen
(74) *Attorney, Agent, or Firm*—Novak Druce + Quigg

(57) ABSTRACT

A communication system (100) has a portal (110), a subscriber (108), a plurality of content providers (112), and a communication network for providing communication between the portal, the subscriber and the plurality of content providers. The components of the communication system are programmed to transmit to the subscriber from the portal an available selection of the plurality of content providers, select at the subscriber a select one of the plurality of content providers, and transmit content provider registration corresponding to the selected content provider from the portal to the selected content provider.

17 Claims, 2 Drawing Sheets

EFFORTLESS REGISTRATION WITH CONTENT PROVIDERS AND METHODS THEREOF

CROSS REFERENCE TO RELATED APPLICATIONS

This application is a continuation of, and accordingly claims the benefit of, U.S. patent application Ser. No. 11/025,737, filed with the U.S. Patent and Trademark Office on Dec. 29, 2004 and issued as Patent No.: U.S. Pat. No. 7,478,123 B2 on Jan. 13, 2009.

FIELD OF THE INVENTION

This invention relates generally to registration processes, and more specifically to an effortless registration with content providers and methods thereof.

BACKGROUND OF THE INVENTION

It is now common place to apply security measures at commercial content providers. Each content provider typically requires registration information such as a login and password for each of its members. Often consumers have accounts at more than one content provider (e.g., banking, corporate email, investing, etc.), each account having its own unique registration information.

The least secure and least desirable approach used by consumers to remember registration information is to simply write down their account information for each provider on a piece of paper and store it in a place they can readily find.

Alternatively, software applications have been developed that operate on a subscriber device (e.g., a laptop) for managing storage and later retrieval of account information. This approach, however, is very cumbersome to consumers who use multiple subscriber devices such as a laptop, cell phone, or desktop computer at any one time.

It would be undesirable for a consumer to have to manually update registration information across multiple devices or for systems and client devices to be burdened with synchronization overhead. Moreover, in the case where such devices are manufactured by different vendors, it is very likely that the account management software will not be operable on all devices, which adds a further complexity to maintaining passwords for a content provider within multiple client devices.

Accordingly, it would be desirable to consumers to be able to register with content providers effortlessly. The invention described below provides an apparatus and method to overcome the prior art disadvantages described above.

SUMMARY OF THE INVENTION

Embodiments in accordance with the invention provide a system and method for effortless association between services in a communication system.

In a first embodiment of the present invention, a communication system has a portal, a subscriber and a plurality of content providers coupled to each other by way of a communication network of the communication system. The communication system employs a method having the steps of transmitting to the subscriber from the portal an available selection of the plurality of content providers, selecting at the subscriber a select one of the plurality of content providers, and transmitting content provider registration corresponding to the selected content provider from the portal to the selected content provider.

In a second embodiment of the present invention, a communication system has a portal, a subscriber, a plurality of content providers, and a communication network for providing communication between the portal, the subscriber and the plurality of content providers. The components of the communication system are programmed to transmit to the subscriber from the portal an available selection of the plurality of content providers, select at the subscriber a select one of the plurality of content providers, and transmit content provider registration corresponding to the selected content provider from the portal to the selected content provider.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

DETAILED DESCRIPTION OF THE DRAWINGS

Figure 1:
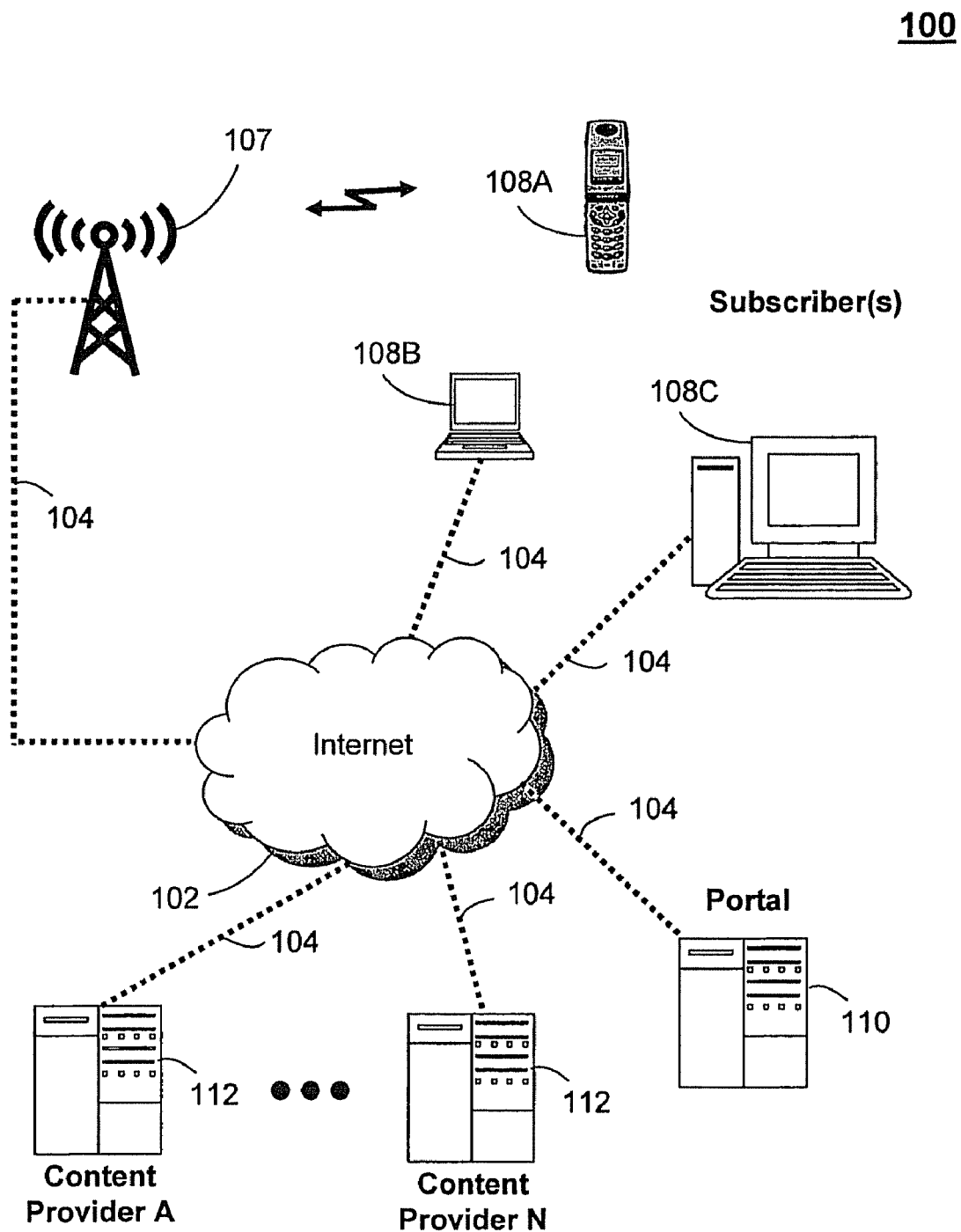
FIG. 1 is an illustration of a communication system in accordance with an embodiment of the present invention.

While the specification concludes with claims defining the features of embodiments of the invention that are regarded as novel, it is believed that these embodiments will be better understood from a consideration of the following description in conjunction with the figures, in which like reference numerals are carried forward.

Referring to FIG. 1, a communication system 100 having a portal 110, a plurality of content providers 112 (A through N), and three embodiments of a subscriber 108A-C (represented by way of example as a wireless phone or wireless personal digital assistant, a portable computer laptop, and computer desktop, respectively) is shown. Each of the components 108-112 is able to intercommunicate by way of a communication network of the communication system 100. The communication network of FIG. 1 includes a conventional cellular network 107 coupled to a conventional Internet network 102.

The cellular network 107 provides a wireless means for communicating to the subscriber 108A. Alternatively, the cellular network 107 can be replaced or supplemented by a conventional wireless local area network (such as Bluetooth, or IEEE 802.11) for short to mid-range communications. Any wireless communication network suitable to the invention as described herein can be used.

The cellular network 107, and components 108B-C, 110 and 112 are coupled to the Internet 102 by way of conventional wire line or wireless means 104. Wire line means 104 can include but is not limited to a conventional phone line, cable, or optical system coupled to a central office or like switching means, which eventually interconnects to the Internet 102. Wireless means 104, alternatively, can be represented by a wireless local area network, microwave relay tower, or like communication means. For the invention described henceforth, the means 104 used for communicating to the Internet 102 can comprise any conventional communication technology capable of interconnecting with the Internet 102. All such embodiments therefore are considered to be within the scope and spirit of the claims below.

The subscribers 108 shown in FIG. 1 are devices employing conventional hardware and software, details of which are well known in the art. The plurality of content providers 112 can be public or private entities providing content service. The content supplied can be of any form (auctioning, banking, email, investment information, retirement accounts, commercial tools, etc.). Typical content providers available by way of the Internet 102 include search engine sites, auction sites, corporate email, just to name a few. The hardware and software used by these providers to provide content services is conventional and well known in the art.

The portal 110 is typically used for providing consumers and/or corporate users a single point of access to content services. Generally, portions of the content services supplied are an integral part of the portal 110. Such integral content services include but are not limited to corporate email, database information management, and corporate productivity tools.

Where content provider services are subcontracted, the portal 110 makes available a predefined interface for receiving content from these providers. Content providers that support the predefined interface benefit from a pre-registered accessibility state with the portal 110. That is, members of the portal 110 experience an "always on" accessibility state as a result of the pre-registration. Additionally, the content supplied by these conforming content providers can be presented to a subscriber 108 in a consistent and, in some instances, similar manner to the integral content services provided by the portal 110.

The portal 110 of FIG. 1 presents controllable content to the subscribers 108 using a HTML (Hyper Text Markup Language) document representing the aggregation of content from one or more conforming content providers coupled to the portal 110 (herein referred to as portlets). The HTML document is processed by a conventional browser (like, for example, Netscape™) operating in the subscriber 108 and presented to a user by way of a conventional display and/or audio system of the subscriber 108.

The portlets can be selected and the content therein can be manipulated by way of a keypad, navigation device or other conventional input and output processing means of the subscriber 108. Alternatively, control of the HTML document can be supplemented by a voice recognition application operating on the subscriber 108 that is capable of controlling portions of the HTML document.

The portal 110 of FIG. 1 uses conventional hardware and software for aggregating content. Details of these technologies are well known in the art. However, to support access of content providers 112 that have not adapted to the predefined interface of the portal 112 described above, the portal 110 uses additional software that provides a subscriber 108 the ability to effortlessly register with content providers 112 in accordance with an embodiment of the present invention.

Figure 2:
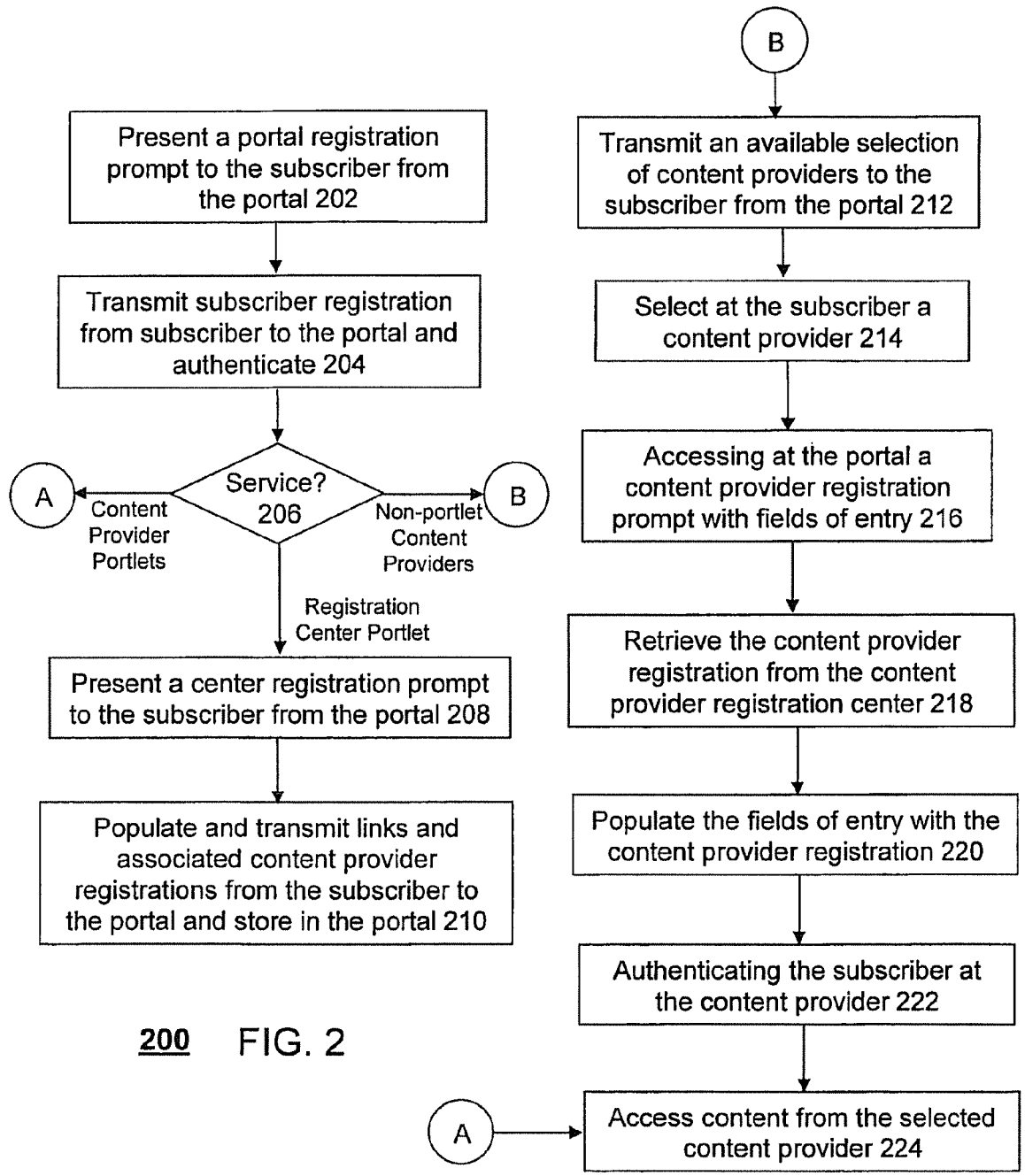
FIG. 2 is a flow chart illustrating a method for an effortless registration with content providers in accordance with an embodiment of the present invention.

FIG. 2 illustrates a flow chart of a method 200 applied in part to the aforementioned software of the portal 110. The flow chart begins with step 202. In this step the subscriber 108 starts by registering at the portal by way of a portal registration prompt presented by the portal 110. The portal registration prompt includes at least one subscriber registration-field of entry. In most instances, the prompt can include a login and a password field. For greater security, a conventional random number generator operating on the subscriber 108 which is synchronized with the portal 110 can be used to further randomize the password.

Once a user of the subscriber 108 populates the subscriber registration fields, the portal 110 authenticates the subscriber 108. If the registration information is valid, then the method 200 proceeds to step 206; otherwise, the portal 110 can send a registration failure message to the subscriber 108 and remain at step 204 until the subscriber 108 successfully enters valid registration information.

In step 206, the portal 110 provides the subscriber 108 a choice of services. Some of these services can be content provider portlets in which case no registration is required as described above, and the subscriber 108 can directly access content from a selected content provider in step 224. The portal 110 also provides a content provider registration center in the form of a portlet. The content provider registration center is used for storing registration information of content providers 112 not conforming to the predefined interface.

To add a non-conforming content provider 112 to the portal 110, the user of the subscriber 108 selects the content provider registration center portlet, thereby proceeding to step 208. In this step the portal 110 presents to the subscriber 108 a center registration prompt comprising a plurality of content provider fields of entry, each entry for populating a plurality of links and associated plurality of content provider registrations.

Any number of links or registration fields can be entered for each non-conforming content provider 112. Typically, a link can be represented by a URL (Uniform Resource Locator). Alternatively, a link can be represented by a conventional Internet Protocol (IP) address. Any form of location identification that provides a means for accessing a select content provider 112 in the communication system 100 can be used with the invention. Moreover, each link provided for the non-conforming content providers 112 can be applied to the portal 110 as corresponding bookmarks (or like references), which the subscriber 108 can apply in the selection step 214. Content providers 112 will typically use two registration fields such as a login and a password. Alternatively, additional fields can be used for more security.

In step 210, the user populates the link(s) and associated content provider registrations for each of the content providers 112. The subscriber 108 in turn transmits the links and associated content provider registrations to the portal 110 for storage. Once this information is stored, the portal 110 is prepared to provide access to these content providers 112 in an effortless manner to the user of the subscriber 108.

The effortless experience is the result of processing steps 212-222. Returning to step 206, when the user of the subscriber 108 wants to choose a non-portlet content provider 112, the portal 110 proceeds to step 212. In step 212, the portal 110 transmits to the subscriber an available selection of content providers 112 such as bookmarks in the form of a pop-down menu. In step 214, the user of the subscriber 108 selects one of the available content providers 112.

After making a selection in step 214, the portal 110 accesses a content provider registration prompt in step 216 from the selected content provider 112. The content registration prompt has at least one content provider registration field of entry. In a first embodiment, the content registration prompt is not presented to the user of the subscriber 108 so that the experience that follows from steps 218-224 is nearly a direct transition from selection to the content of the selected content provider 112. Alternatively, the portal 110 can present the content provider prompt to the subscriber 108 and the population steps that follow.

In step 218, the portal 110 retrieves from the content provider registration center the content provider registration corresponding to the content provider 112 selected in step 214. In step 220, the portal 110 populates the content provider registration fields of entry with the content provider registration by transmitting said information utilizing conventional techniques to the browser operating on the subscriber 108 (as mentioned above), which in turn performs the population step. Once the fields have been populated, the selected content provider 112 authenticates the subscriber 108 in step 222.

If the authentication is successful, the content provider 112 proceeds to step 224 where it provides the subscriber 108 access to its content services. If the authentication is unsuccessful, the portal 110 can generate an error message and direct the subscriber 108 to step 208 to enter the correction registration information for the selected content provider 112. Alternatively, the portal 110 can present the content provider registration prompt to the subscriber 108 and request the user to populate the registration fields. If authentication is successful in this embodiment, the portal 110 can then update the registration fields previously entered by the subscriber in step 208 for the selected content provider 112.

By storing registration information for each of the content providers 112 at the portal 110, the subscriber 108 has a central access point for retrieving said information, thereby avoiding the difficulties in the prior art of maintaining synchronized copies of registration information across multiple devices and/or in multiple locations. Further, the registration method 200 applied to the portal 110 and subscriber 108 overcomes the inability of the prior art to provide an effortless registration with content providers 112 as described above. The application of method 200 also allows users to upgrade or replace a subscriber 108 with no impact to the registration process described in FIG. 2.

In light of the foregoing description, it should be recognized that embodiments in the present invention could be realized in hardware, software, or a combination of hardware and software. These embodiments could also be realized in numerous configurations contemplated to be within the scope and spirit of the claims below. It should also be understood that the claims are intended to cover the structures described herein as performing the recited function and not only structural equivalents. The claims are sufficiently general to include equivalent structures.

For example, although a wire line communication means and a wireless communication means described above may not be structural equivalents in that a wire line employs a physical link (e.g., copper or optical cables) for communications, whereas a wireless communication system employees radio signals for communications, wire line and wireless communication means may be equivalent structures. Accordingly, all equivalent modifications of the description are intended to be included within the claimed scope as defined in the following claims.

What is claimed is:

1. In a communication system comprising a portal, a subscriber and a plurality of content providers coupled to each other by way of a communication network of the communication system, a method comprising the steps of:
   transmitting to the subscriber from the portal an available selection of the plurality of content providers;
   selecting at the subscriber a select one of the plurality of content providers;
   transmitting content provider registration corresponding to the selected content provider from the portal to the selected content provider;
   the selected content provider registering the subscriber based on the transmitted content provider registration;
   transmitting from the subscriber to the portal a plurality of links and associated plurality of content provider registrations, each corresponding to a select one of the plurality of content providers;
   storing in the portal the plurality of links and associated plurality of content provider registrations;
   selecting at the subscriber a content provider registration center of the portal for storing the plurality of links and corresponding plurality of content provider registrations;
   during a communication session where the subscriber accesses the portal:
      presenting to the subscriber from the portal a center registration prompt comprising a plurality of content provider fields of entry, each entry for populating the plurality of links and associated plurality of content provider registrations;
      populating from the subscriber the plurality of content provider fields of entry with the plurality of links and associated plurality of content provider registrations;
      storing the plurality of links and associated plurality of content provider registrations in the portal; and
   during a different communication session where the subscriber accesses the portal:
      accessing at the portal a content provider registration prompt from the selected content provider, the content provider registration prompt comprising at least one content provider registration field of entry;
      retrieving from the content provider registration center the content provider registration corresponding to the selected one of the plurality of content providers;
      populating from the portal the at least one content provider registration field with the content provider registration.

2. The method of claim 1, responsive to the registering step, establishing an interactive communication link between the registered subscriber and the content provider.

3. The method of claim 2, wherein the content provider registration was previously stored within the portal so that during a communication session including the selecting step, the subscriber was not prompted to provide data contained within the content provider registration.

4. The method of claim 3, further comprising the steps of:
   after the establishing step, selecting at the subscriber a different select one of the plurality of content providers;
   transmitting a different content provider registration corresponding to the selected different content provider from the portal to the selected different content provider;
   the selected different content provider registering the subscriber based on the different content provider registration; and
   responsive to the registering step, establishing an interactive communication link between the registered subscriber and the different content provider, wherein the different content provider registration was previously stored within the portal so that during a communication session including the selecting steps, the subscriber was not prompted to provide data contained within the different content provider registration.

5. A machine-readable storage having stored thereon, a computer program having a plurality of code sections, said code sections executable by a machine for causing the machine to perform the steps of:
   transmitting to the subscriber from the portal an available selection of the plurality of content providers;
   selecting at the subscriber a select one of the plurality of content providers;
   transmitting content provider registration corresponding to the selected content provider from the portal to the selected content provider;
   the selected content provider registering the subscriber based on the transmitted content provider registration;

transmitting from the subscriber to the portal a plurality of links and associated plurality of content provider registrations, each corresponding to a select one of the plurality of content providers;

storing in the portal the plurality of links and associated plurality of content provider registrations;

selecting at the subscriber a content provider registration center of the portal for storing the plurality of links and corresponding plurality of content provider registrations;

during a communication session where the subscriber accesses the portal:

presenting to the subscriber from the portal a center registration prompt comprising a plurality of content provider fields of entry, each entry for populating the plurality of links and associated plurality of content provider registrations;

populating from the subscriber the plurality of content provider fields of entry with the plurality of links and associated plurality of content provider registrations;

storing the plurality of links and associated plurality of content provider registrations in the portal; and during a different communication session where the subscriber accesses the portal:

accessing at the portal a content provider registration prompt from the selected content provider, the content provider registration prompt comprising at least one content provider registration field of entry;

retrieving from the content provider registration center the content provider registration corresponding to the selected one of the plurality of content providers;

populating from the portal the at least one content provider registration field with the content provider registration.

6. The machine-readable storage of claim 5, responsive to the registering step, establishing an interactive communication link between the registered subscriber and the content provider.

7. The machine-readable storage of claim 6, wherein the content provider registration was previously stored within the portal so that during a communication session including the selecting step, the subscriber was not prompted to provide data contained within the content provider registration.

8. The machine-readable storage of claim 7, said code sections further causing the machine to perform the steps of:

after the establishing step, selecting at the subscriber a different select one of the plurality of content providers;

transmitting a different content provider registration corresponding to the selected different content provider from the portal to the selected different content provider;

the selected different content provider registering the subscriber based on the different content provider registration; and responsive to the registering step, establishing an interactive communication link between the registered subscriber and the different content provider, wherein the different content provider registration was previously stored within the portal so that during a communication session including the selecting steps, the subscriber was not prompted to provide data contained within the different content provider registration.

9. A communication system, comprising:
a portal;
a subscriber;
a plurality of content providers; and
a communication network for providing communication between the portal, the subscriber and the plurality of content providers; wherein the components of the communication system are programmed to:

transmit to the subscriber from the portal an available selection of a plurality of content providers;

select at the subscriber a select one of the plurality of content providers;

transmit content provider registration corresponding to the selected content provider from the portal to the selected content provider;

register, at the selected content provider, the subscriber based on the transmitted content provider registration, wherein the content provider registration was previously stored within the portal so that during a communication session including the selecting step, the subscriber was not prompted to provide data contained within the content provider registration;

responsive to the registering at the selected content provider, establish an interactive communication link between the registered subscriber and the content provider after establishing the interactive communication link, selecting at the subscriber a different select one of the plurality of content providers;

transmitting a different content provider registration corresponding to the selected different content provider from the portal to the selected different content provider;

register by the selected different content provider the subscriber based on the different content provider registration; and respond to the registering by establishing an interactive communication link between the registered subscriber and the different content provider, wherein the different content provider registration was previously stored within the portal so that during a communication session including the selecting steps, the subscriber was not prompted to provide data contained within the different content provider registration.

10. The communication system of claim 9, wherein the components of the communication system are further programmed to:

present to the subscriber from the portal a portal registration prompt comprising at least one subscriber registration field of entry;

populate from the subscriber the at least one subscriber registration field with the subscriber registration.

11. The communication system of claim 9, wherein the components of the communication system are further programmed to authenticate the subscriber at the portal.

12. The communication system of claim 9, wherein the components of the communication system are further programmed to authenticate the subscriber at the selected content provider.

13. The communication system of claim 9, wherein the components of the communication system are further programmed to:

transmit from the subscriber to the portal a plurality of links and associated plurality of content provider registrations, each corresponding to a select one of the plurality of content providers; and store in the portal the plurality of links and associated plurality of content provider registrations.

14. The communication system of claim 13, wherein the subscriber is further programmed to select at the subscriber a content provider registration center of the portal for storing the plurality of links and corresponding plurality of content provider registrations.

15. The communication system of claim 14, whereupon selecting the content provider registration center, wherein the components of the communication system are further programmed to:
 present to the subscriber from the portal a center registration prompt comprising a plurality of content provider fields of entry, each entry for populating the plurality of links and associated plurality of content provider registrations;
 populate from the subscriber the plurality of content provider fields of entry with the plurality of links and associated plurality of content provider registrations; and
 storing the plurality of links and associated plurality of content provider registrations in the portal.

16. The communication system of claims 15, wherein the components of the communication system are further programmed to:
 accessing at the portal a content provider registration prompt from the selected content provider, the content provider registration prompt comprising at least one content provider registration field of entry;
 retrieving from the content provider registration center the content provider registration corresponding to the selected one of the plurality of content providers; and
 populate from the portal the at least one content provider registration field with the content provider registration.

17. The communication system of claims 9, wherein the portal is further programmed to authenticate the subscriber at the selected content provider.

* * * * *